United States Patent

Byron et al.

Patent Number: 5,255,357
Date of Patent: Oct. 19, 1993

[54] METHOD FOR EDITING CHARACTER BIT MAPS AT SMALL SIZES USING CONNECTED RUNS

[75] Inventors: Michael Byron, Mountain View; Thomas Malloy, Portola Valley, both of Calif.

[73] Assignee: Adobe Systems Incorporated, Mountain View, Calif.

[21] Appl. No.: 67,333

[22] Filed: May 25, 1993

Related U.S. Application Data

[63] Continuation of Ser. No. 552,788, Jul. 13, 1990, abandoned.

[51] Int. Cl.$^5$ .................... G06F 15/62; G06F 15/70
[52] U.S. Cl. .................... 395/151; 345/144
[58] Field of Search ............... 395/150, 151; 340/728, 340/730, 731, 735; 382/47, 54

[56] References Cited

U.S. PATENT DOCUMENTS

| | | | |
|---|---|---|---|
| 4,675,830 | 6/1987 | Hawkins | 364/518 |
| 4,851,825 | 7/1989 | Naiman | 340/728 |
| 4,937,761 | 6/1990 | Hassett | 364/518 |
| 4,962,465 | 10/1990 | Saito et al. | 364/518 |
| 5,093,870 | 3/1992 | Watanabe | 382/47 |

*Primary Examiner*—Gary V. Harkcom
*Assistant Examiner*—Joseph H. Feild
*Attorney, Agent, or Firm*—Roger S. Borovoy

[57] ABSTRACT

A material of displaying a character on a raster device wherein the character is described by means of one or more paths. The crosses where a path intersects horizontal pixel midlines are identified and paired in scan line order as cross pairs. Runs of pixels are identified from the cross pairs. Collisions are identified between two runs of pixels and the repair operation is performed to remove the collision while maintaining the integrity of the character. The most common repair operation is to move or delete one or more of the pixels involved in the collision.

12 Claims, 4 Drawing Sheets

METHOD FOR EDITING CHARACTER BIT MAPS AT SMALL SIZES USING CONNECTED RUNS

This is a continuation of application Ser. No. 07/552,788, filed Jul. 13, 1990, now abandoned.

FIELD OF THE INVENTION

In modern computer systems, it is often desireable to print or display characters in various sizes on paper, film or a computer screen. When the size of the character is large relative to the resolution of the display or print device, it is relatively easy to choose which picture elements or pixels should be printed or displayed in order to make a readable character. However, when the size of the character is small in relation to the resolution of the display, it is much more difficult to choose which pixels to display in order to make the character as distinct and recognizable as possible. The current invention relates to an improved method of legibly displaying characters at low resolution.

BACKGROUND OF THE INVENTION

Traditionally, characters have been printed using metal type which allows very detailed rendering of a character, including subtle curves and very fine lines. A character may be alphanumeric, an Oriental or other foreign language character, or even a fanciful design and may be printed in a variety of point sizes. In modern computer devices, characters are defined on raster devices such as video display terminals or laser printers or by using a multi-pin print head. Characters can be printed on a surface or displayed on a video screen as a series of dots which are printed or turned on in order to approximate as closely as possible the ideal shape of the character. When characters are small enough relative to the resolution of the display device, choosing which pixels should be displayed to accurately represent the character becomes more complex than when the character is large. A typical video monitor can display about 72 pixels per inch. At this resolution it is difficult to display legibly most type faces smaller than about twenty pixels tall.

An ideal representation of the character is usually defined in "character space" at very high resolution as one or more areas bounded by an outline or path. A character consists of one or more continuous black areas. For instance the letter "O" consists of a single closed loop, the letter "d" consists of a loop connected to a line and the letter "i" consists essentially of a dot a short distance away from a line which may have additional details such as serifs. One way of describing a character involves defining an outline of the outer edge of each contiguous black portion of the character and then filling that outline to display the character. Since characters are usually printed in dark ink on a light background, one can describe filled areas as black but one skilled in the art will recognize that the method of this invention can be used to determine what pixels are candidates for display using any of many fill methods, including characters which are light on a dark background, commonly used in video displays, or characters on backgrounds having a different color are also within the teachings of this invention. The outline is preferably defined as one or more paths, each of which is usually traced in one direction, either clockwise or counterclockwise. Each path can be represented as a sequential series of curves and/or linear line segments called edges. If a black area has interior white spaces as, for instance, in the letter "O", each interior white area can also be defined by a path consisting of a series of edges.

Figure 2A:
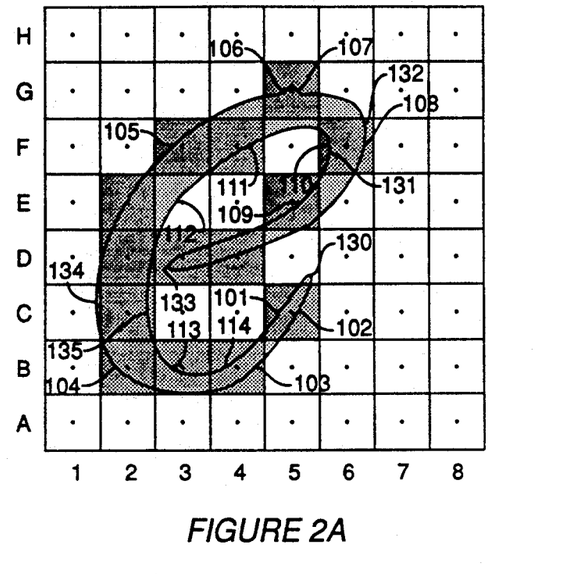
FIGS. 2A, 2B, 2C and 2D in sequence illustrate pixel mapping of a character "e" using the method of the present invention.

When a character is displayed on a raster device, those pixels which fall within the black area of the character should be displayed, that is, they should be printed on a surface or turned on for a video display. At high resolution or when the character is very large, multiple pixels may fall within each black area and the character can be displayed in great detail. When the character is reduced to a small size, however, or the resolution of the device is limited, certain black areas may no longer cover multiple pixels and in fact may cover only a fraction of a pixel. Displaying small characters on a device of limited resolution has been a persistent problem in the past. "n", "s" and "e" on a $6 \times 7$ matrix and in FIG. 2 by an italic character "e" on an $8 \times 8$ matrix of pixels. In FIG. 2A the outline of the character "e" is illustrated as filled at very high resolution (light gray) and low resolution (darker gray). The raster display, however, can only turn on or off entire pixels, which corresponds to the darker gray.

One prior approach to this problem is the center point fill method and the improved fill method described in the copending application entitled "Connected-Run Dropout-Free Center Point Fill Method For Displaying Characters" by the same inventors and filed on Jun. 15, 1990. One problem that occurs with many fill methods is that certain character features may be found in close proximity. As the display resolution decreases the pixel fill method chosen sometimes turns on pixels that cause parts of the character bitmap to touch each other that actually should not be in contact. This introduces errors in the topology of the character that greatly reduce the legibility. For example, in FIGS. 1A, 1B and 1C the "n" closes in at the bottom instead of having an open space between the legs, and the curves of the "e" and the "s" both touch the main body of the character and change the bitmap into something like a small "8". In FIG. 2A, the italic "e" is difficult to read.

One method of resolving these problems is described in U.S. patent application Ser. No. 07/388,339, now abandoned in favor of continuation application Ser. No. 07/775,267, filed Oct. 11, 1991, entitled "Method For Editing Character Bitmaps at Small Sizes". That application describes how to turn on pixels according to the outline of a character using one of the fill rules such as center point fill, and modify the display by turning off or moving pixels that cause the character to close improperly. The present invention provides a faster method for modifying the display by turning off or moving pixels that cause the character to close improperly.

SUMMARY OF THE INVENTION

The present invention details a method to detect and fix certain topological errors in character bitmaps by (1) enumerating runs of pixels in an order determined by the path topology, (2) searching for collisions, which are runs that improperly touch other runs in the character bitmap, and (3) cleaning up bitmap to fix such incorrect contacts.

A character bit-map is "cleaned up" by identifying collisions where two runs touch but should not, then moving or deleting one or more pixels in order to display the character more legibly. This procedure is typically done after a character has been prepared for display using one or more fill methods such as the center point fill, horizontal proximity fill, connected run fill and X inflection fill described in the prior art. See, for example, United States Patent Application entitled "Connected-Run Drop Out-Free Center Point Fill Method for Displaying Characters" by the same inventors, filed on Jun. 15, 1990.

One object of the present invention is to modify the appearance of a character in order to make it more legible at small sizes.

Another object of this invention is to provide a rapid method for such modification.

DETAILED DESCRIPTION OF THE INVENTION

The concept of describing characters by means of an outline has been explained above. A character can be represented by a series of filled areas which contrast with the background. For convenience, the filled areas will be referred to as black areas, as in ink printed on a page, but the area can be filled by many methods well known to those skilled in the art. Also for convenience, pixels in black areas and runs of pixels are described as "displayed" but the method actually selects pixels for subsequent display using a desired fill method. A complete black fill is presumed for purposes of this specification, and all selected pixels are displayed.

The outline of each black area can be defined by a closed path consisting of sequential series of curves or linear line segments called edges. The interior of a character can be distinguished from the background by drawing a line from a point in any direction past the greatest extent of the character and counting the number of intersections with the path. If the number of intersections is odd, the point is inside the character and if the number is even the point is outside. As described above, characters which have enclosed white spaces such as the character "0" will have at least one additional path consisting of a series of edges to define each enclosed space. A character may contain more than one black area such as the letter "i" or many oriental characters. Once a path or series of paths is defined for a character, that path can, for example, be stored in computer memory and can be used for displaying characters of arbitrary size.

Filling the Character

To display a character in a defined pixel area, often referred to as display space, the outline of the character must first be scaled and placed within a pixel grid by methods well known to those skilled in the art. Referring to FIG. 2A, following well-known methods generally known as "center-point fill" pixels, e.g. B2 and B4, having centers which fall on or within the outline of the character were selected and displayed. When the resolution of the display device is low enough relative to character size, certain portions of the character will not include pixel centers and therefore will "drop out," that is, they will no longer be displayed, so the legibility of the character will decrease. In FIG. 2A, for example, pixel E5 does not happen to be included within the character outline and thus would not be displayed, making the character less legible. Such dropouts can be detected by identifying black portions of a character that cross a horizontal midline but do not include a pixel center. They can be corrected by displaying the pixel closest to an edge along that horizontal midline. Methods of performing the horizontal proximity fill test are described in U.S. patent application 07/388,336 filed Aug. 1, 1989 and assigned to the same assignee as the subject application; and in "Connected-Run Dropout-Free Center Point Fill Method For Displaying Characters" filed on Jun. 15, 1990 by the inventors of the subject invention and also assigned to the same assignee. The latter application also describes two additional fill methods, connected run fill and X extreme fill.

In the preferred implementation of the above-described technique, the character is scaled to fit a pixel grid for the desired display space and curves are flattened to a series of connected, linear edges in order along a path. [See, for example, Steven Harrington, "Curves and Fractals," Chapter 11 in *Computer Graphics, A Programming Approach*, 2d Ed., McGraw-Hill, 1987] Each path is traced in one direction (clockwise or counterclockwise) and crosses are identified as points where edges cross a horizontal midline through pixel centers. If an end point of an edge happens to lie directly on a horizontal midline, the end point is moved up or down slightly so that no edge end points are crosses. The crosses are stored in a path list in path order. Edge end points which are X extremes are also identified. In the preferred implementation, edge endpoints which are Y extremes are also identified and the crosses and X and Y extremes are included in the same path list. One skilled in the art may choose to include additional end points in the path list to represent the path more accurately.

The order of crosses on each scan line is determined and stored as a list in scan line order. The crosses on each line are paired, forming "cross pairs," to easily identify where a black section of the character crosses a horizontal midline. In FIG. 2A, for example, horizontal scan line D includes a cross pair in pixel D2 and a second cross pair with crosses in pixels D3 and D4. The goal of this display method is to determine a run of one or more horizontally adjacent pixels for each cross pair and then to modify runs or add runs if needed in order to display the character as a series of connected runs. Runs can be described for convenience by the starting and ending pixel, e.g., B2-B2 or B3-B4.

To display pixels by the center point fill method, each cross pair is tested and where a center point of a pixel such as pixels D2 or D3 falls within a cross pair or intersects a cross, that pixel is displayed. This results in most cross pairs being displayed as runs. Where a cross pair is located between two adjacent pixel centers such as in pixels E5 and E6 in FIG. 2A, the preferred implementation determines the midpoint between the cross pair and displays a run of one pixel for that cross pair, the pixel containing that midpoint (the pixel having a center closest to the midpoint). This process is called horizontal proximity fill. After performing center point fill and horizontal proximity fill, each cross pair is displayed by a run of at least one pixel.

The horizontal proximity fill method will not catch certain dropouts where a black section of the character intersects a vertical midline without intersecting a pixel center. U.S. patent application 07/388,336 describes methods including using a variation of the horizontal proximity fill test to correct such dropouts. In the preferred implementation, those dropouts are corrected by connected run fill and X extreme fill as described in detail in copending application "Connected-Run Dropout-Free Center Point Fill Method for Displaying Characters" by the same inventors and filed on Jun. 15, 1990.

For connected run fill, each cross pair is compared to each adjacent cross pair and the runs associated with adjacent cross pairs are tested to see if they are properly connected, that is, making pixel-to-pixel contact along a pixel edge or at a pixel corner. Adjacent cross pairs are identified by tracing the path associated with each cross of the pair, identifying the preceding and subsequent cross along each path and finding the cross pair for each of those crosses. Runs associated with adjacent cross pairs are called adjacent runs. Referring to FIG. 2A, cross pair 114-103 has two adjacent cross pairs. Cross 114 is followed in path order (based on a clockwise path) by cross 101, which is part of cross pair 101-102, and preceded by cross 113, which is part of cross pair 103-113. Cross 103 is followed by cross 104 and preceded by cross 102, so cross pair 114-103 has two adjacent cross pairs, 101-102 and 103-113. Cross pair 101-102 has only one adjacent cross pair. Cross pairs may be tested in many possible orders. In the preferred form of the invention the scan lines are examined in order and each cross pair is tested in the order it is encountered. One skilled in the art will recognize that looking in only one vertical direction and only one horizontal direction will avoid duplicate testing of the same two adjacent cross pairs. One skilled in the art will also recognize that cross pairs can be examined, for example, by following character features from one Y extreme to the next. Each cross pair is tested for proper connection against adjacent cross pairs that are up from or to the right of the cross pair being tested. For example, in FIG. 2A, the first cross pair is 104-113 on scan line B, which is tested against the upper, adjacent cross pair in pixels C1 and C2 and against the right, adjacent cross pair 114-103.

The run displaying the current cross pair is tested to see if it is connected to runs displaying adjacent cross pairs. Two runs are connected if at least one pixel in one run shares an edge or corner with one pixel in the other run. In the preferred implementation, pixels are considered square but one skilled in the art will recognize how to test runs of pixels which are not square.

Two adjacent runs on adjacent scan lines which are also separated by one or more non-displayed pixels are not properly connected and the dropout is repaired using the method described in the next section.

Figure 1A:
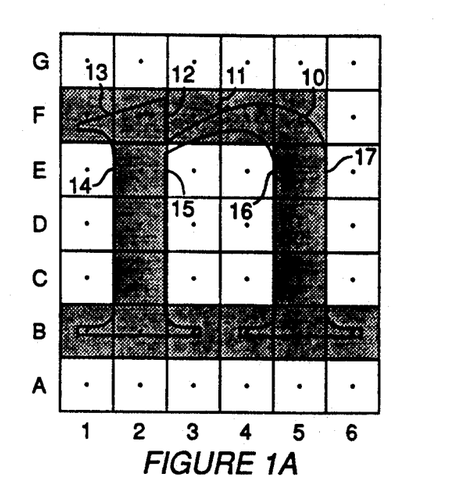
FIGS. 1A-1F illustrate pixel mapping of characters using a simple or modified center point fill method before using (1A, 1B, 1C) and after using (1D, 1E, 1F) the method of the present invention.
Figure 1B:
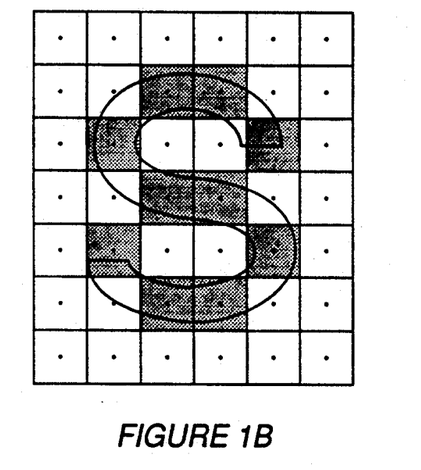
Figure 1C:
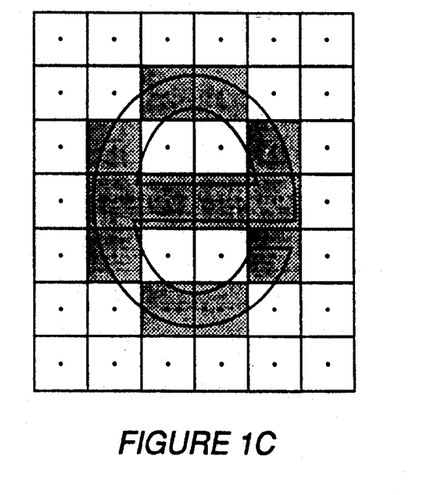
Figure 1D:
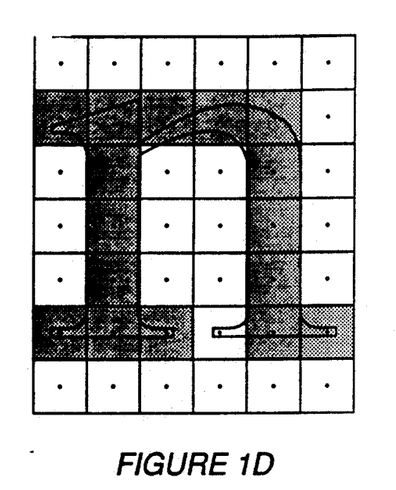
Figure 1E:
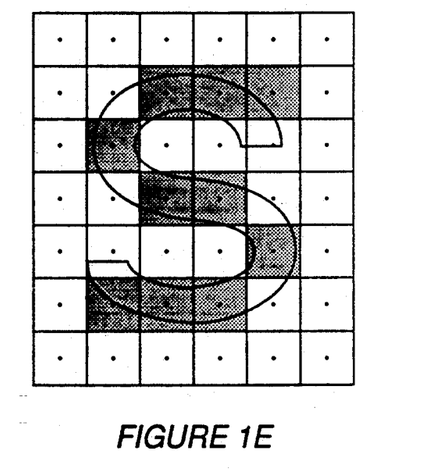
Figure 1F:
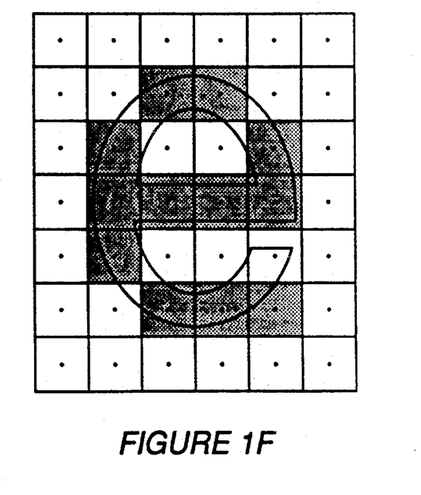

Two adjacent runs in the same scan line but separated by one or more non-displayed pixels may still be connected by a continuous portion of the character. In the preferred implementation, two such adjacent runs are considered connected if runs "neighboring" those runs complete a connection between them. Two runs are neighbor runs if a curve can be drawn between a cross of the cross pair for one run and a cross of the cross pair of the second run without crossing a path or a horizontal midline. Referring, for example, to FIG. 1A, adjacent runs E2-E2 (for cross pair 14-15 where the center of pixel E2 is within the cross pair) and E5-E5 (for cross pair 16-17) are not connected directly but both are connected through neighbor runs F1-F3 (a line can be drawn from e.g. cross 10 to cross 17 or cross 14 without crossing a horizontal midline or a path) and F4-F5. Otherwise a dropout is noted and repaired using the method described below.

Fixing Dropouts

Dropouts are fixed by extending existing runs or creating new runs. To connect runs that are not properly connected, two scan lines are examined and the intersections, called vertical intersections, between any path and the vertical midline through the column including each dropped-out pixel are identified. The intersections in each column are placed in order vertically, and one or more appropriate pixels containing vertical midpoints are displayed by extending existing runs or adding new runs, as needed.

Two adjacent scan lines must be selected and analyzed in order to fix dropouts. A dropout could occur between two runs in the same scan line or between two runs in adjacent scan lines. If the dropout occurs between runs on adjacent scan lines, the following test is performed using those two scan lines. If the dropout occurs between runs on the same scan line, any path that connects the runs necessarily goes above or below the horizontal midline of that scan line. By testing the path between the innermost crosses, that direction is determined and the scan line containing the cross pairs and the adjacent scan line in the direction indicated by the path are examined using the following test. For example, in FIG. 2A, the path between cross pairs 105-111 and 110-108 goes up at each of crosses 105, 111, 110 and 108 so the current and upper scan lines, F and G, are selected as of interest and tested as described below.

Every path segment between crosses in the scan lines of interest is traced, noting any vertical intersections with the vertical midline through each column containing a dropped-out pixel. The highest intersection along the lowest path and the lowest intersection along the highest path are taken as intersections of particular interest, the midpoint of those two intersections is found, and the pixel containing that midpoint is selected for display, applying an arbitration test if necessary, e.g. if the midpoint fell on a pixel boundary.

To complete the connection of the cross pairs being examined, some adjustment of one or more runs is required, incorporating each pixel to be displayed with a previously existing run if possible. One skilled in the art will recognize that selection and modification of runs can be done using one or more of several methods: by looking at the proximity of each cross to the midline of each newly displayed pixel; by always selecting one, e.g. the leftmost, cross arbitrarily; or by other suitable tests.

If pixels to be displayed cannot be connected to existing runs, new crosses or pseudocrosses are defined and paired. The pseudocrosses should be on the horizontal midline through a pixel to be displayed and should not overlap an existing cross pair. In the preferred implementation, pseudo-crosses are created on the horizontal midline of a pixel to be displayed, on alternate sides of the vertical midline of that pixel, less than half a pixel-unit from and preferably relatively close to the vertical midline. If this placement overlaps an existing cross pair, the position of the pseudocross pair is adjusted to avoid the overlap. The pseudocross pair is included in scan line order to display a run including the new pixel.

A run of more than one pixel to be displayed can be marked with a single pseudocross pair. A complex figure may require more than one pseudocross pair to fix and display dropouts. In order to implement the present invention, the new pseudocrosses are included in path order for the character as described below.

Extremes

Certain characters include narrow horizontal features which may not be easily displayed at low resolution by using only the fill methods described above. The scaled character, that is, scaled t the pixel grid of the desired display space, is examined to identify (horizontal) X extremes—points where delta X changes sign. Delta X is the change in X from point to point along the path and changes sign whenever X hits a local horizontal maximum or minimum and then begins to move in the opposite direction. An X extreme is also marked when delta X becomes 0 or when delta X ceases to be 0, which corresponds to the top and bottom points of a vertical feature. An X extreme does not have to include a dramatic feature, however. For example, the character in FIG. 2A includes maximum X extremes 130, 131 and 132 in pixels D5 and F6(two), respectively and minimum X extremes 133, 134 and 135 in pixels D3, C1 and C2, respectively. In the preferred implementation, X extremes are identified in the pass when crosses are identified and the extremes are stored in a separate list in path order. In the preferred implementation, the extremes were included in the list of edge end points and crosses.

To properly display a character, the center point fill, horizontal proximity fill and connected run fill described above are first performed. In a subsequent pass, each extreme is tested for proper connection to a displayed run. The path through each extreme is traced forward and backward to identify the closest adjacent run, in path order. If the extreme is within one-half pixel distance of an adjacent run, no further processing is required and the extreme is ignored.

The remaining extremes are analyzed by tracing the path forward and backward from the extreme to the closest cross pair in each direction and identifying intersections with vertical midlines between the closest adjacent run and the extreme. As described for the connected run dropout fill described above, the vertical intersections in each column are ordered, midpoints are identified, and one or more pixels are displayed by extending existing runs and/or creating pseudocross pairs and adding new runs.

Differences from Prior Invention

This invention requires more restrictive handling of fixing dropouts than the previous invention. The previous invention allowed dropouts to be fixed by extending any existing run or creating pseudocrosses which were not necessarily part of the outline. This invention requires that each run be connected to all its neighbor runs, that is, drop-outs must be fixed by extending (or creating) only neighbor runs. Extending runs to fix a dropout is done using the same method as the previous invention except only neighbor runs are eligible, not all runs.

To create a new run in this invention, a new cross pair must be created using the same method as the creation of a pseudocrosses in the previous invention. The path must be modified with a new vertical excursion which includes the new cross pair, and it must be done so that the new cross pair is a neighbor run to the original runs with the dropout. In the preferred implementation, a vertical excursion is added into the path segment that connects the two original runs, or included with a path segment that connects neighbor runs. These additional path excursions are all marked so that they can be skipped when determining vertical intersections. This allows more accurate interpolation of the correct pixel for fixing dropouts in connected-run fill.

For example, in FIG. 2A, the original path (not shown) did not cross the midline of scan line G. C5 was a drop-out between adjacent runs F3-F4 and F6-F6 which was filled according to the connected run method. Using the earlier method described in the co-pending patent by the same inventors, pseudo-cross pair 106-107 was created. In the present invention, three points were added to the path. Two are crosses 106 and 107. A third point was added above the crosses to complete a vertical excursion of the path.

Collisions

Once drop-outs have been filled, the clean up process can begin. A collision is an undesirable touch between two runs which are not neighbor runs. Collisions are identified by three different methods. The first method checks for runs on the same scan line that are touching on one edge. For the purpose of this invention, "touching" means that two runs share a common pixel edge (an edge touch) or contact each other at a pixel corner (a corner touch). Referring to FIG. 2A, run D2-D2 and run D3-D4 constitute a collision because they touch at the pixel edge between pixels D2 and D3.

The second method for finding collisions finds all path segments between two crosses in path order where (a) both crosses are on the same scan line and (b) the leftmost of the two crosses is the leftmost cross of its cross pair and the rightmost of the two crosses is the rightmost cross of its cross pair. For example, crosses 101 and 102 in pixel C5 are adjacent in path order and fit the criteria of this test. Cross 104 in pixel B2 and cross 103 in pixel B4 also meet this criteria. There are one or two runs of interest. If both of the crosses are in the same cross pair, the single run of interest is the run displaying that cross pair. If both crosses are not in the same cross pair, then there are two runs of interest. These are the two runs which display each of the cross pairs respectively containing each of the crosses. The adjacent scan line on the same side of the two crosses as the path segment connecting them is examined for other runs. There is a collision with each run on the adjacent scan line that touches one of the runs of interest. For example, in FIG. 2A, run D3-D4 touches run C5-C5 at a pixel corner.

The third method of identifying collisions checks the connectivity of white areas between runs. These areas can be considered "white runs" which display "white cross pairs" which can easily be determined using the scan row list of crosses. This procedure compares white runs on one line against white runs on adjacent scan lines in which the corresponding white cross pairs are adjacent on a path. The white runs are connected if they share at least one edge. In the preferred implementation, common corners between white runs are not sufficient to connect the white runs. The runs bounding the white runs are examined and any two runs which are not adjacent on a path but touch and are also horizontally adjacent to adjacent white runs are said to collide. For example, white run E3-E4 and white run F5-F5 are adjacent in path order but they do not share a common pixel edge. Cross 110 in pixel F6 is adjacent to cross 109 in pixel E5; crosses 111 and 112 are adjacent to each other. Run F3-F4 is horizontally adjacent to white run F5-F5 and run E5-E5 is horizontally adjacent to white run E3-E4. Since runs F3-F4 and E5-E5 are not adjacent but touch at a corner, those runs create a collision.

Clean Up

Once a collision is identified, a repair is attempted. The two runs in the collision are referred to as "trespasser runs". The configuration of the two trespasser runs and the sets of neighbor runs for each trespasser run is used to determine the repair operation(s) to try.

Repair operations consist of moving or deleting pixels in one or both trespasser runs. Repair operations must never sever connections between neighbor runs. For many configurations, there will be a number of different acceptable repair operations. It may be necessary to try more than one repair operation for a particular collision in a character, since the first operation that is tried may fail. For instance, moving a pixel up may cause another collision with another run, while deleting the pixel may repair the collision without creating other collisions.

The actual operation(s) used for any configuration and the order in which the operations are tried depends upon many factors besides the character configuration. The artistic goals of the typographer are important, for instance, whether "move pixel" operations are preferred to "delete pixel" operations. Limitations in the implementation may play a role, for instance, "move pixel" operations may be limited if the implementation does not allow new runs to be created during the clean-up phase. Those skilled in the art will recognize other factors as well.

The preferred implementation of this invention is limited to collisions between single pixels which do not overlap. Covered configurations include:
   a. two runs on the same scan line which touch at one edge but do not overlap;
   b. two runs on different scan lines which touch at exactly one corner; and
   c. two runs on different scan lines which touch on one edge where at least one run is exactly one pixel wide.

Other collisions are not dealt with by the preferred implementation of this invention.

For collisions that meet one of the above conditions, the two pixels that are actually touching are considered "trespassers." Thus each collision has a pair of trespassers. Displayed pixels which are included in neighbor runs and share an edge or corner with a trespasser are called "neighbors" of that trespasser. Pixels which are deleted by the clean-up method of this invention are still considered to be neighbors even though they are no longer displayed so as to avoid introducing additional distortion in a character. See Example 2 below.

For each trespasser being analyzed, the locations of neighbor pixels and the other trespasser of the pair are mapped into a 3×3 matrix called the "neighbor matrix". Operations which may be performed on the trespasser being analyzed which will repair the collision are selected for each matrix and given a relative "merit" value according to a set of guidelines given below. The basic operations possible are deleting the trespasser or moving it. A move could be in one of many directions, preferably up, down or sideways. The merit value is used to decide the order in which operations are tried.

For each neighbor matrix, the selected operations are stored along with the corresponding relative merit value in a database or look up table. Note that the selected operations for each trespasser are independent of the neighbors of the corresponding trespasser of the pair. One skilled in the art will recognize that there are ways to optimize this stored information, for instance, by leaving out matrices that have no selected operations, and by storing only certain rotations of matrices.

A collision has been repaired in an actual character as follows. For each trespasser pixel, a neighbor matrix was determined, then the repair operation(s) with merit values were obtained from the database. This resulted in a combined list of selected operations for both matrices. The operations were tried in merit value order until one succeeded. If no operation had succeeded, the collision was ignored. If a number of operations had the same merit value, one was chosen by (a) simply trying the next one in the list; (b) picking the operation based on the location of the trespasser in the original character; (c) evaluating the effect of each operation on nearby pixels which are not part of the neighbor matrices, or (d) other factors recognized by one skilled in the art.

The following guidelines were used in the preferred implementation to select operations for particular neighbor matrices:
(a) No more than one pixel can be deleted from each end of a run (this minimizes the effects of clean-up on long, horizontal features),
(b) Pixels can be moved horizontally or vertically but not diagonally,
(c) Pixels can be moved only to a position alongside neighbor pixels (thus no new runs are created),
(d) Pixels cannot be moved to make a straight feature curve (it is unlikely that a character would look better after splitting a straight feature into a curved one),
(e) Pixels generally cannot be deleted to create a "nick" in a feature (e.g. pixel D4 in FIG. 3B cannot be deleted).
(f) Single pixels (pixels with no neighbors) cannot be deleted and preferably are not moved (some moves may be desirable, for example adjusting the dot in a lower case i),
(g) If an operation would produce another collision that is as bad as the original collision for a particular neighbor matrix, it is not included in the list of operations for the matrix.

The following guidelines were used in the preferred implementation to select merit values for the selected operations:
(a) Move operations receive higher merit than delete operations.
(b) It is better to move a pixel that is at the end of a feature than to move one in the middle of a feature.
(c) It is better to delete the last pixel in a feature than to delete a pixel in the middle of a feature (deleting a pixel in the middle must also preserve connections between runs).
(d) Operations that result in no collisions receive more merit than operations that have left-over collisions. Moreover, an edge touch must be repaired to at least a corner touch, or the operation is not selected at all.

For example, referring to FIG. 2A, run D2-D2 touches run D3-D4. Pixels D2 and D3 are touching on an edge so they are trespassers. Pixel D2 has neighbors E2 and C2 so the neighbor matrix for pixel D2 looks like:

```
. x .
. x t
. x .
``` where the trespasser of interest is represented by an "x" centered in the matrix, its neighbors are also represented by x's, the other trespasser (D3) is represented by a "t", and other pixels (displayed or not) are represented by a ".". For pixel D3, the neighbor matrix looks like:

```
   . . .
   t x x
   . . .
```

Figure 2B:
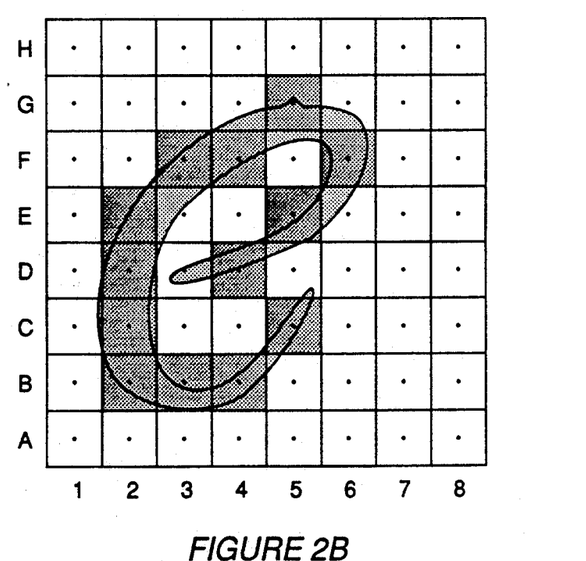

No operations were selected in the neighbor matrix for D2 (deleting the center pixel would sever the displayed pixels and moving the center pixel to the left would distort the straight line portion of the character and would still leave two other corner collisions, C2-C2 v. D3-D3 and E2-E2 v. D3-D3 ). The neighbor matrix for D3 allows the operation of deleting the center pixel (the trespasser is at the end of run D3-D4). Trespasser D3 could perhaps be moved diagonally right and up or left and down, but such a move generally is not likely to look acceptable and in this character also would create new touches. Although delete has a relatively low merit, it was the selected operation and was used to effect the repair. As shown in FIG. 2B, pixel D3 (now shown as white) was deleted and run D3-D4 is updated to be run D4-D4.

Run D4-D4 (updated by the preceding repair) and run C5-C5 also collide at the corner. The trespassers are D4 and C5. The corresponding neighbor matrices are:

```
        . . x          t . .
   D4:  x x .     C5:  . x .
        . . t          x . .
```

Note that pixel D3 is a neighbor of D4 even though pixel D3 was deleted in the previous repair.

The neighbor matrix for D4 produces one operation: a "move-up" operation which has a high merit since it is a move. The neighbor matrix for C5 produces two operations: move down (high merit) and delete (low merit). In the preferred implementation, the C5 move operation has higher merit than the D4 move operation because D4 is in the middle of the feature while C5 is at the end. The operation "move C5 down" is attempted and does not cause other collisions. Therefore, the chosen repair, shown in FIG. 2C, moves C5 down, thus deleting run C5-C5 and extending run B2-B4 to B2-B5.

Figure 2C:
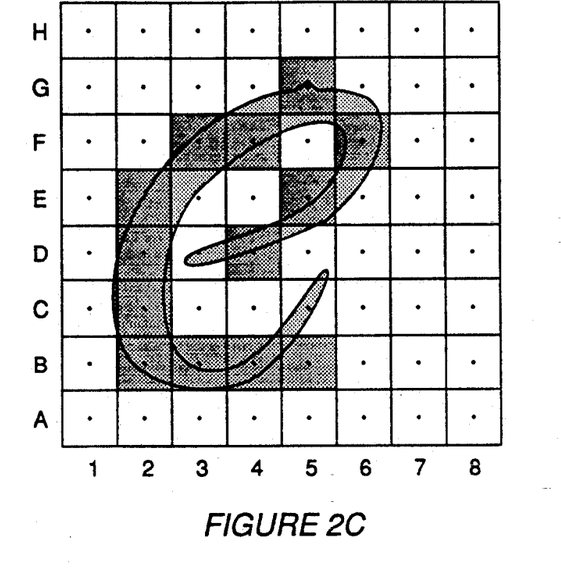

Referring to FIG. 2C, the third detection method finds a corner collision between runs F3-F4 and run E5-E5. The trespassers are pixels F4 and E5. The neighbor matrices are:

```
        . . x          t . x
   F4:  x x .     E5:  . x .
        . . t          x . .
```

Figure 2D:
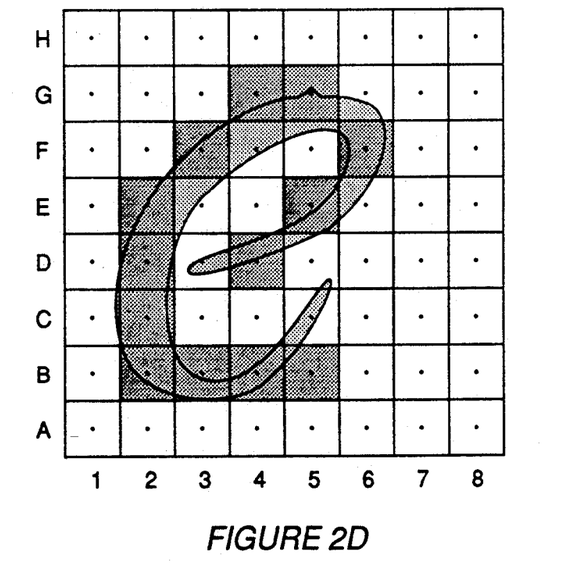

The F4 neighbor matrix allows a "move up" operation of high merit. The E5 neighbor matrix allows no operations. The operation "move F4 up" does not cause other collisions so F4 is moved up, as shown in FIG. 2D, updating run F3-F4 to F3-F3 and extending run G5-G5 to become G4-G5.

One skilled in the art will recognize that the relative merit of ordering pixel deletions and the criteria for choosing to move rather than delete the pixel can be modified. A choice of whether to move a pixel, for instance, can be made contingent on the effects of prior edits or that decision can be postponed until the rest of the character is edited to see if the move can be avoided. One skilled in the art will recognize that edge collisions and corner collisions may be acceptable in some circumstances and not in others and rules for possible operations ca be adjusted accordingly. One skilled in the art will also recognize that the path of the character can be modified to minimize or delete collisions.

One skilled in the art will recognize and be able to practice additional variations on the methods described herein which fall within the teachings and claims of this invention, as further clarified in the following examples.

Example 1

Figure 3A:
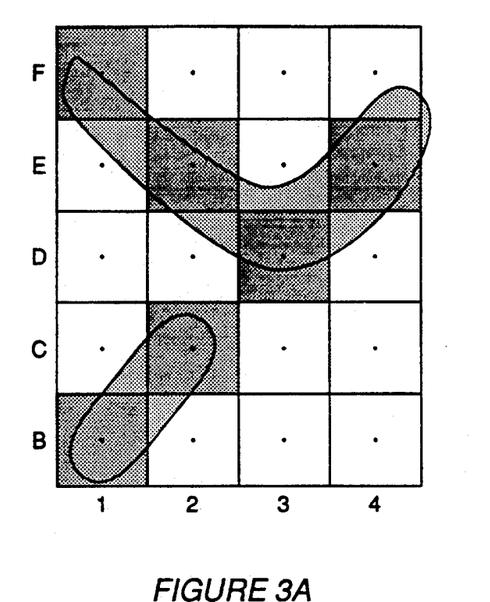
FIGS. 3A-3B illustrate details of using the present invention.

Referring to FIG. 3A, runs D3-D3 and C2 C2 collided and pixels D3 and C2 were trespassers. The neighbor matrices were:

```
        . . t          x . x
   C2:  . x .     D3:  . x .
        x . .          t . .
```

Looking up these neighbor matrices in the database, trespasser C2 could be moved left or down. Both move operations had the same merit—there was nothing in the matrix to dictate which to choose. Each of these move operations had a high merit. Trespasser C2 could also be deleted, which had a merit lower than any move operation but relatively high for a delete.

Trespasser D3 could not be deleted because it maintained a connection between E2 and E4. It could be moved up. This operation had a medium merit because (a) moves were better than deletes, but (b) it was likely that changing the curve outline feature to a straight feature will change the appearance of the character. Complete analysis yielded four operations which were ranked by relative merit.

| | |
|---|---|
| 1. Move C2 left | High merit |
| 2. Move C2 down | High merit (equal to the first operation) |
| 3. Move D3 up | Medium merit |
| 4. Delete C2 | Lower merit |

The operations were each tried in merit order. In the preferred implementation, the tie between operations 1 and 2 was resolved by selecting operation 1.

Example 2

Figure 3B:
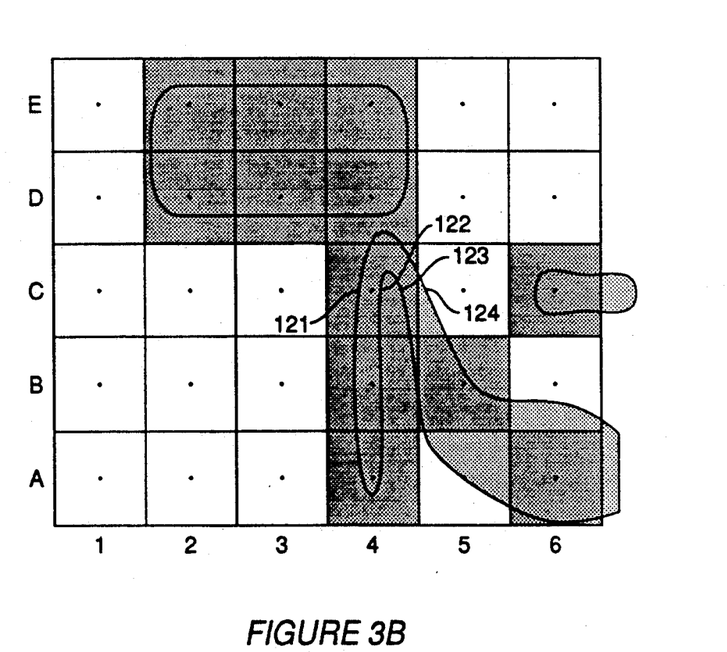

This example illustrates the benefit of including deleted pixels in the neighbor matrix even though they were not displayed. Referring to FIG. 3B, pixel C4 was displayed by two overlapping runs, both designated C4-C4. One run was for cross pair 121-122 and the other was for cross pair 123-124. Each of these runs collide with pixel D4. Both runs for 121-122 and for 123-124 had the same neighbor matrix although this is not necessarily true for all overlapping runs. The trespassers were C4 and D4. The neighbor matrices were:

```
            x x .         . t .
    D4:     x x .    C4:  . x .
            . t .         . x x
```

Looking up these neighbor matrices, trespasser D4 could not be deleted or moved according to the rules of the preferred implementation (deletion would create a "nick" in the feature and no moves were possible). Trespasser C4 could be deleted from both runs displaying that pixel, so C4 was deleted. This result is proper for the run for 121-122 as well as for the run for 123-124 b®cause the neighbor matrix is the same. In the preferred implementation, the cross pairs were maintained in path order although no longer displayed by any pixel.

Still referring to FIG. 3B, runs B5-B5 and C6-C6 also constitute a collision, with trespassers B5 and C6. The neighbor matrices were:

```
            (x) . t             . . .
    B5:     . x .        C6:    . x .
            . . x                t . .
```

If pixel C4, which was deleted in the previous step, was ignored when calculating the neighbor matrix for pixel B5, the character could become unduly distorted. Pixel C4 is represented in the neighbor matrix for B5 by "(x)", above. Trespasser C6 had no neighbors so it could not be moved or deleted. Pixel B5 could not be deleted or moved (either operation would sever the connection between C4 and A6). No operation was allowed and both pixels B5 and C6 remained displayed. If pixel C4 were not included in the neighbors of B5, B5 could have been deleted thus severing the connected path from A6 to B4.

As will be apparent to one skilled in the art, many changes in the details of the collision identification and repair technique of this invention can be made which are well within the spirit and scope of the general invention as described. Therefore the only limitations to be placed upon the scope of that invention are those set forth in the claims which follow.

What is claimed is:

1. In a method of displaying a character having one or more black areas in the form of a plurality of pixels on a raster device which generates a plurality of horizontal scan lines in sequential order, wherein the character is described by an outline comprising one or more path segments; a cross is defined by the intersection of the character outline with the horizontal midline of a pixel; a cross pair is defined by two crosses which reside on the same scan line; runs of pixels are identified as the pixels between the two crosses of a cross pair, an improvement comprising the steps of: identifying where two of said runs collide with each other to cause a collision, and repairing the character by eliminating said collision between said two runs of pixels while maintaining the integrity of the character.

2. The improvement of claim 1 wherein said collision is between two runs on the same scan line which overlap.

3. The improvement of claim 1 wherein the step of identifying said collision includes the steps of: (1) identifying a path segment whose endpoints occur at the locations defined by two crosses, both on the same scan line, and where the leftmost of said two crosses is the leftmost cross of its respective cross pair and the rightmost of said two crosses is the rightmost cross of its respective cross pair; (2) for each cross pair containing at least one of said two crosses, identifying the scan line adjacent to said same scan line and lying on the same side of said two crosses as said path segment; and (3) identifying runs of pixels in said adjacent scan line that touch said first run, thereby creating one or more collisions.

4. The improvement of claim 1 wherein said collision is where said two runs are black and are not adjacent in path order by touch at a corner.

5. The improvement of claim 1 wherein said collision to be repaired is between runs on the same scan line, said runs touching each other at one edge but not overlapping.

6. The improvement of claim 1 wherein a collision is defined by two runs of pixels, and wherein each of said runs of pixels has a pixel which touches a pixel of the other run, wherein said collision identification step includes identifying the touching pixels as two trespassers, the first trespasser having neighbor pixels, and wherein the repairing step includes deleting or moving a first of said trespassers based on the relative configuration of said first trespasser, its neighbor pixels and the said second trespasser.

7. The improvement of claim 6 wherein said relative configuration of said first trespasser, the neighbor pixels of said first trespasser and said second trespasser is evaluated on a three by three matrix having a pixel in each matrix cell, wherein said first trespasser is in the center cell of said matrix.

8. The improvement of claim 1 wherein said repairing step comprises moving or deleting a pixel in one of said runs.

9. The improvement of claim 8 wherein said repairing step moves one or more pixels.

10. The improvement of claim 1 wherein said collision to be repaired is a collision between two runs on different scan lines, each run having a pixel which touches a pixel in the other run at one corner.

11. The improvement of claim 1 wherein said collision to be repaired is a collision between two runs on different scan lines, each run having a pixel which touches a pixel in the other run at one edge and wherein at least one of said pixel runs is only one pixel wide.

12. The improvement of claim 1 wherein said collision to be repaired is a collision between two runs on the same scan line, each of said two runs having a pixel which touches a pixel on the other run on one edge.

* * * * *

UNITED STATES PATENT AND TRADEMARK OFFICE
CERTIFICATE OF CORRECTION

PATENT NO. : 5,255,357
DATED : Oct. 19, 1993
INVENTOR(S) : Michael Byron, et al

It is certified that error appears in the above-indentified patent and that said Letters Patent is hereby corrected as shown below:

| | | |
|---|---|---|
| In the Abstract, line 1 | delete "material" | insert --method-- |
| Col. 03, line 48 | delete "0" | insert --O-- |
| Col. 05, line 25 | delete "103-113" | insert --104-113-- |
| Col. 05, line 27 | delete "103-113" | insert --104-113-- |
| Col. 06, line 61 | delete "pseudo-crosses" | insert --pseudocrosses-- |
| Col. 07, line 12 | delete "t" | insert --to-- |
| Col. 08, line 11 | delete "C5" | insert --G5-- |
| Col. 08, line 15 | delete "pseudo-cross" | insert --pseudocross-- |
| Col. 12, line 21 | delete "C2 C2" | insert --C2-C2-- |
| Col. 13, line 13 | delete "b®cause" | insert --because-- |

Signed and Sealed this

Sixth Day of September, 1994

BRUCE LEHMAN

Attest:

Attesting Officer

Commissioner of Patents and Trademarks